No. 680,825. Patented Aug. 20, 1901.
G. WESTINGHOUSE.
SPEED CHANGING GEARING.
(Application filed June 8, 1896.)
(No Model.) 2 Sheets—Sheet 1.
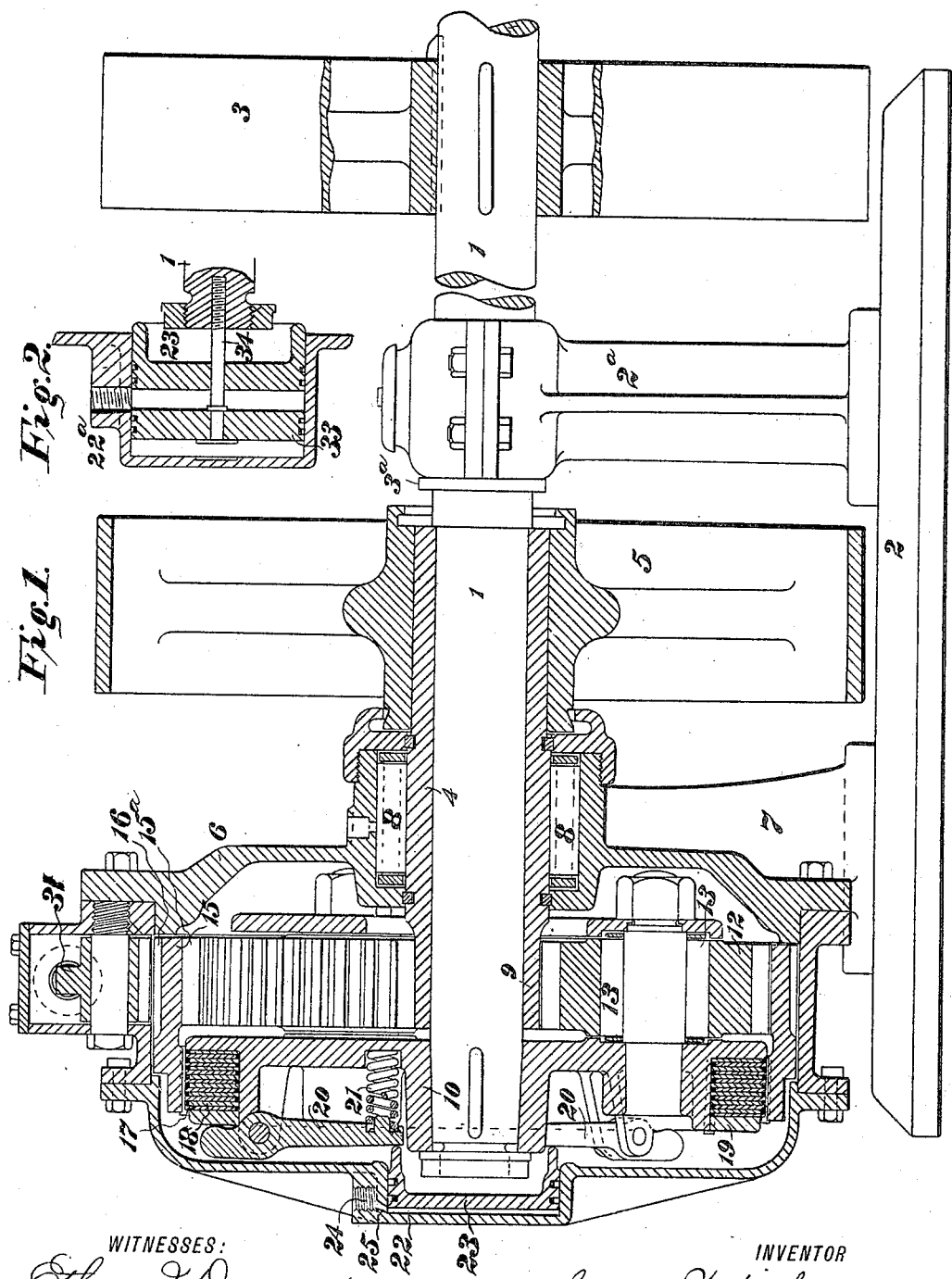

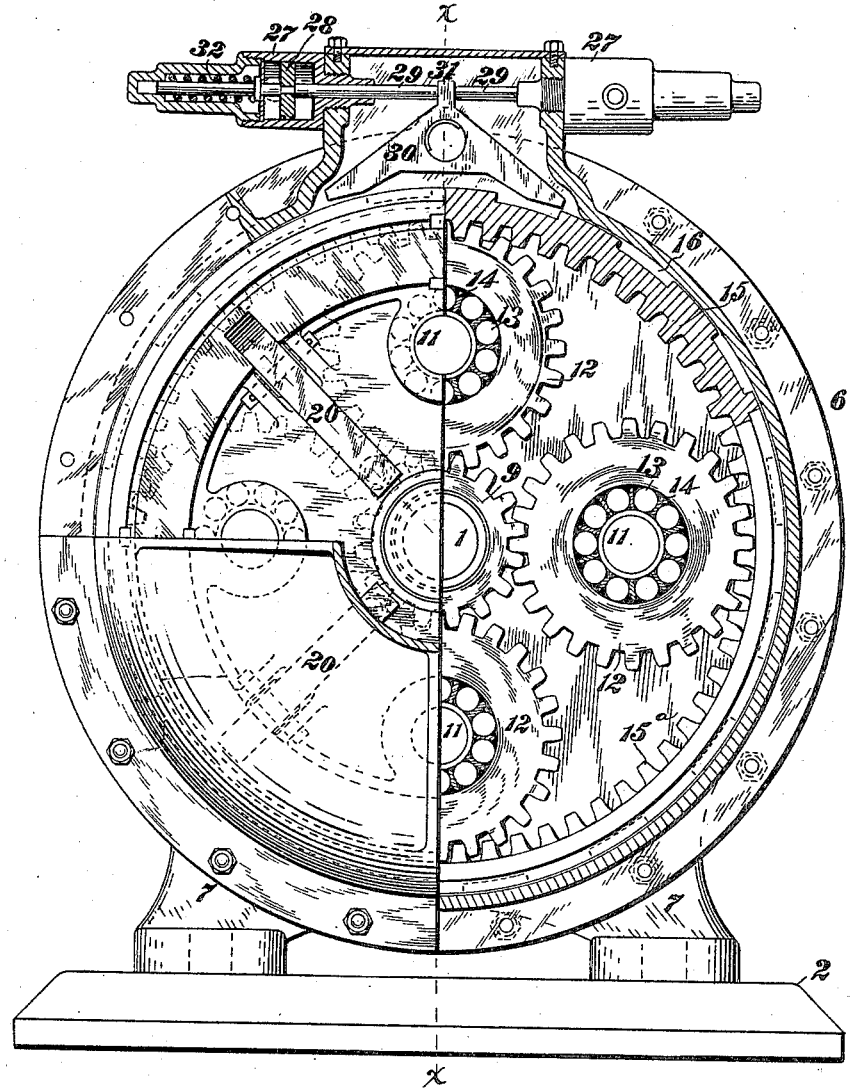

UNITED STATES PATENT OFFICE.

GEORGE WESTINGHOUSE, OF PITTSBURG, PENNSYLVANIA.

SPEED-CHANGING GEARING.

SPECIFICATION forming part of Letters Patent No. 680,825, dated August 20, 1901.

Application filed June 8, 1896. Serial No. 594,654. (No model.)

*To all whom it may concern:*

Be it known that I, GEORGE WESTINGHOUSE, a citizen of the United States, residing in Pittsburg, in the county of Allegheny and State of Pennsylvania, have invented a new and useful Improvement in Speed-Changing Gearing, (Case No. 708,) of which the following is a specification.

My invention relates to mechanical movements, and more particularly to mechanism employed for transmitting and applying rotary motion to shafts and axles.

The object of my invention is to provide a simple and efficient means whereby the speed of rotation of a shaft or axle may be made equal to the speed of rotation of another shaft or axle to which it is connected or may be made to have either a greater or less speed than such other shaft or axle with a corresponding, but inverse, variation of torque.

My invention is particularly well adapted for use in cases where it is desired to start a vehicle or machine—such, for example, as a lifting-crane—under load by means of a source of power having approximately constant speed and constant torque. It is possible by means of mechanism constructed in accordance with my invention to apply to the machine or vehicle to be started under load a torque greatly in excess of that applied to the shaft, which is directly actuated by the source of power, the speed, of course, being correspondingly reduced. It is also adapted to and may be employed for securing an acceleration of speed with a corresponding reduction in torque whenever the conditions of working warrant or demand such a utilization of power.

In the accompanying drawings, Figure 1 is a view of my speed-changing gear, mainly in longitudinal section on line $x\ x$ of Fig. 3, but partially in side elevation. Fig. 2 is a sectional detail view of a modification; and Fig. 3 is a view, partially in end elevation and partially in transverse section, of the speed-changing gear.

The details of construction illustrated in Figs. 1 and 3 are as follows: 1 is a rotatable body, which in the present instance is shown as a shaft, but which in certain relations would be the axle of a vehicle, and 2 is a bed-plate provided with a suitable bearing block or standard $2^a$ for the shaft 1.

3 is a belt-pulley keyed to the shaft 1, this device being shown as indicative of means for transmitting power to or from the shaft and of course might be a gear-wheel or other device suitable for this purpose.

$3^a$ is a collar on the shaft 1 adjacent to the part $2^a$.

4 is a sleeve or hollow shaft which surrounds the shaft 1, so as to turn independently thereof when the two are not locked to rotate together. This sleeve or hollow shaft 4 has keyed to it a belt-pulley 5, which is also indicative of any suitable device for transmitting power to or from such sleeve 4.

6 is a casing supported upon the base-plate 2 by means of the standard 7. The latter is preferably provided with a set of bearing-rollers 8 for the sleeve 4, but a different kind of bearing may be employed, if desired. The sleeve 4 obviously constitutes one of the bearings for the shaft 1 when the two rotate at different speeds, and both the sleeve and shaft are supported, the one directly and the other indirectly, by the rollers 8, their housing, the standard 7, and the base-plate 2. The sleeve 4 is provided at one end with a pinion 9, either formed integral with it or keyed to it. Rigidly mounted upon the corresponding end of the shaft 1 and adjacent to the pinion 9 is a head 10. This head 10 is provided with a plurality of inwardly-projecting studs or posts 11, four of such studs or posts being employed in the structure illustrated in the drawings. The invention is, however, not limited as regards the number of these parts. A gear-wheel 12 is mounted upon each of these studs or posts 11, a series of bearing-rollers 13, held in a suitable cage or frame 14, being interposed between the gear-wheel and the post. Any other suitable form of bearing may be employed, if desired. The gear-wheels 12 and their bearing-studs are so mounted upon the head 10 that the former will mesh with the pinion 9. An annulus 15 is mounted in the casing 6 and is of such diameter as to fit loosely therein, the internal periphery of the casing constituting a circumferential bearing for the external periphery of the annulus. This annulus 15 is provided with internal gear-teeth 15$^a$, which mesh with the teeth of the gear-wheels 12, and its external periphery is provided with a series of notches 16, the purpose of which will be hereinafter specified. The annulus is extended laterally beyond the internal gear-teeth and the notches 16 and is provided with a plurality of annular metal plates 17. The head 10 is provided with an equal number of similar metal plates 18, which alternate with and extend between the metal plates 17. A thick annular plate 19, which is not connected to either the head or annulus, surrounds the head adjacent to the sets of plates above described. A plurality of levers 20, four being employed in the present instance, are pivoted to the head 10 at points between the gear-wheels 12. The shaft-arms of the levers 20 extend over the ring 19, and stiff coiled springs 21 are interposed between the ends of the long arms of the levers and the head 10, thus normally pressing the plates 17 and 18 together. A short cylinder 22 is provided in the end of the casing 6, and in this cylinder is a hollow piston 23, the inner edge of which rests against the extreme ends of the long arms of the levers 20. A screw-threaded socket 24 for the reception of the end of an air-pipe is connected with the cylinder 22 by means of a small opening 25. The upper portion of the casing 6 is provided with two air-cylinders 27, in which are located pistons 28, each of these pistons being provided with a stem or rod 29. A double locking-dog 30 is pivoted in the upper portion of the casing 16 and provided with an upwardly-projecting lug 31, which is located between and in engagement with the inner ends of the stems or rods 29. These stems or rods are normally pressed inwardly toward each other by means of coiled springs 32 in order to hold the dog 30 in and return it to its central position.

The operation of the mechanism described is as follows: With the parts in the position indicated in the drawings the plates 17 and 18, which constitute the respective members of a friction-clutch, will be held in engagement by the levers 20 and springs 21, and thus cause the shaft 1 and sleeve 4 to rotate together as a single part, and the speed of rotation of the pulley 3 will be the same as that of the pulley 5. If, however, air under suitable pressure be admitted to one of the cylinders 27, according to the direction in which the shafts are to rotate, the dog 30 will be rocked into engagement with the adjacent notch 16 in the annulus 15, thus locking the annulus against movement. At the same time air is admitted into the cylinder 22, which forces the piston 23 against the ends of the long arms of the levers 20, overcomes the action of the springs 21, and thus removes the pressure from the plates 17 and 18. The head 10 is then free to rotate independently of the annulus 15, and the power applied to the pulley 5 and sleeve 4 will be transmitted by means of the pinion 9, the intermediate gear-wheels 12, and the head 10 to the shaft 1 and pulley 3. The speed of the shaft 1 and pulley 3 will, however, be materially less than that of the pulley 5 and sleeve 4, the ratio of reduction depending upon the relative sizes of the gears employed. With this reduction in speed there will obviously be an increase in the torque, which are the conditions ordinarily desired in starting a shaft or axle under load. When the desired speed is attained, the air may be exhausted from the cylinders 22 and 27, and the parts will automatically return to the several positions indicated in the drawings. If it is desired under any circumstances, however, to secure for a limited time a greater speed with lesser torque, it may be done by applying the power to the pulley 3 and transmitting it from the pulley 5.

In the construction shown in Figs. 1 and 3 the end thrust upon the shaft 1, exerted by the air-pressure in the cylinder 22, is taken by the collar 3$^a$ and the bearing-block 2$^a$.

In the modification shown in Fig. 2 the cylinder 22$^a$ is provided with a supplemental piston 33, which is connected to the shaft 1 by means of a rod 34, which extends through the piston 23. By means of this construction the pressure of the air introduced between the pistons 23 and 33 will be exerted against both pistons and there will therefore be no tendency to move the shaft 1 longitudinally in its bearings.

It will be understood that the normal relation of the parts may be such that the two shafts will rotate at different speeds, in which case the application of air-pressure will serve to lock the parts instead of acting to release them.

Other means than compressed air—such, for example, as electromagnetic energy—may also be employed for actuating the clutch and locking-dog, if desired.

While I have illustrated and described specific mechanism for carrying out my invention, I desire it to be understood that variations may be made therein other than those specified without departing from the spirit and scope of the invention.

I claim as my invention—

1. The combination with two rotatable members and speed-changing gearing intermediate the same, of two sets of clutching devices having springs that act simultaneously to insure rotation of said members at the same speed and means for applying fluid-pressure to said two sets of clutching devices simultaneously to overcome the action of said springs and insure rotation of said members at different speeds.

2. A speed-changing gear comprising two rotatable shafts, gearing connecting said shafts, two sets of adjustable clutching devices having springs for normally holding the respective devices in locking and in releasing positions and means for applying fluid-pressure to simultaneously overcome the action of said springs.

3. The combination with a rotatable shaft, and a sleeve loosely mounted thereon, of a head keyed to said shaft, a pinion on said sleeve, an internally-toothed gear-wheel journaled independently of said shaft and sleeve, intermediate gear-wheels mounted upon said head and meshing with said pinion and said internally-toothed wheel, and means operated by springs for clutching and by fluid-pressure for unclutching said head and said internally-toothed wheel.

4. The combination with a shaft and a sleeve mounted and rotatable thereon, a head rigidly mounted on said shaft, speed-changing gearing between said head and said sleeve, a spring-actuated friction-clutch normally locking said gearing and clutch-releasing means operated by fluid-pressure to overcome the spring action and thereby permit of the rotation of the shaft and sleeve at different speeds.

5. The combination with a shaft and a sleeve rotatably mounted thereon and provided with a pinion, of an internally-toothed gear-wheel, a head keyed to said shaft and provided with a plurality of intermediate gear-wheels meshing with said pinion and with said internally-toothed wheel, means actuated by spring and air pressure for locking and releasing said internally-toothed wheel, a friction-clutch between said wheel and the head carrying the intermediate gear-wheels, springs for normally holding the members of the clutch in engagement and air-pressure actuated means whereby said clutch members may be separated when the shaft and sleeve are to be rotated at different speeds.

6. The combination with an annulus provided with internal gear-teeth and external notches, a casing having a circumferential bearing for said annulus and a pivoted locking-dog, of air-cylinders and pistons normally holding said dog out of engagement with said annulus, but movable into the notches therein when the air-pressure is applied, a shaft, bearings therefor, a sleeve on said shaft, having a pinion and provided with roller-bearings, a head keyed to said shaft and provided with a plurality of bearing-studs, gear-wheels mounted on said studs and meshing with the toothed annulus and the sleeve-pinion, a set of annular plates carried by said annulus, a similar set carried by the shaft-head and alternating with the first set, spring-actuated levers normally pressing said plates together, and an air-cylinder and piston for actuating said levers to release the clutch-plates from engagement.

7. The combination with a shaft mounted in suitable bearings, of a rotatable sleeve mounted on said shaft and provided with a pinion, an annulus concentric with said pinion and provided with internal gear-teeth, a casing surrounding said annulus and constituting the sole bearing therefor, a plurality of gear-wheels meshing with said pinion and said annulus, a support for said gear-wheels rigid with the shaft and a friction-clutch between said support and said annulus.

8. The combination with a shaft, and a loose gear-wheel, of a second shaft having a pinion rigid therewith, a plurality of gear-wheels supported from the first-mentioned shaft and gearing with said loose gear-wheel and said pinion, a friction-clutch between the first-named shaft and the loose gear-wheel and means actuated by air-pressure for locking the latter when said shafts are to be rotated at different speeds.

In testimony whereof I have hereunto subscribed my name this 4th day of June, A. D. 1896.

GEO. WESTINGHOUSE.

Witnesses:
 WESLEY G. CARR,
 HUBERT C. TENER.